United States Patent Office 2,944,387
Patented July 12, 1960

2,944,387
JET ENGINE SPEED AND NOZZLE CONTROLS

John L. Hall, Hanover, Joseph M. Mergen, Verona, and Douglas A. Elliott, Waldwick, N.J., assignors to Curtiss-Wright Corporation, a corporation of Delaware Filed Sept. 24, 1954, Ser. No. 458,243

7 Claims. (Cl. 60—35.6)

This invention relates to controls for gas turbine engines for aircraft, now commonly known as turbojet engines.

As is well known, turbojet engines comprise an air compressor, a combustion system receiving compressor air and fuel, a turbine coupled to drive the compressor and driven by combustion products, and an exhaust nozzle through which combustion products and surplus heated air are discharged as a propulsion jet. Such engines may include a variable area exhaust nozzle, and may include an afterburner. The latter is used at times to augment jet thrust, and consists of a second fuel feed system discharging into a zone between the turbine and the nozzle. The fuel mixes with surplus air and combustion products discharged from the turbine and is ignited to raise the temperature and thus the velocity of the gas discharged as a propulsive jet from the exhaust nozzle.

Controls for turbojet engines have evolved whose primary purpose is to regulate fuel to a flow which will hold the compressor-turbine spool to a speed, and which will hold the turbine wheel temperature, to a level, which are structurally tolerable. Variations in air density, due to air temperature and altitude and airspeed are taken into account in fuel regulation. Power limitation to hold the engine below operation in conditions of structural hazard and compressor surge are usually incorporated in the fuel control.

In the overall control system herein contemplated, the throttle, manually adjustable by the aircraft pilot to change thrust as a function of throttle position, predominantly controls, in a more or less linear relation, the admission of fuel to the engine. Automatic biases for air density, surge and possibly structural limitations influence the fuel flow, but speed control except as a secondary measure, is not included. Speed control of the engine is controlled by a variable area thrust nozzle, in turn controlled by a governor.

In a first range of throttle movement, fuel flow increases to increase thrust while the engine is operating below maximum tolerable r.p.m. In this phase, r.p.m. may not be governed by the variable area nozzle, as will be explained further.

Upon reaching a throttle position at which maximum r.p.m. is developed, the governor for the variable area nozzle retains a fixed speed command on the engine, and further increases in throttle setting, while admitting more fuel, will not increase engine speed. The governor acts to reduce the nozzle area with increased throttle setting until maximum fuel flow is reached. This maximum fuel flow is limited by maximum turbine temperature, and during thrust increase to this point, fuel flow is also regulated in the fuel control so that compressor surge limits and other design parameters will not be exceeded.

In this range of throttle movement, the throttle can be operated independently of speed since, when maximum speed is attained the variable area nozzle will control speed as a result of governor signals. Alternatively, the throttle may be coordinated with a speed scheduling cam or other device so that the governor is adjusted for an increasing speed setting, up to maximum whereat speed setting remains constant, with increase in throttle position.

A third range of throttle movement may be provided, or a second control may be used, to start afterburner operation wherein a separate supply of fuel, other than the aforesaid fuel supply to the engine compressor and turbine, is fed to the engine downstream of the turbine. When afterburning starts, the engine is already operating at full r.p.m. and at full thrust as limited primarily by turbine temperature. Afterburning, unless the variable nozzle is increased in area, creates a pressure rise downstream of the turbine, thus diminishing the pressure drop across the turbine and decreasing the speed. Accordingly, when the variable nozzle speed governor senses this condition, nozzle area will be increased, thus holding the engine proper, exclusive of the afterburner, at constant maximum operating power and speed.

In the present invention, a speed governor is provided which operates a variable area nozzle, and this system may be substantially independent of the fuel control except as speed scheduling might be desired for the governor in the initial range of throttle movement. The invention includes a speed governor, a tail gate position computer and servo, nozzle actuating clutches driven by the engine and energized by the servo, and transmission means from the clutches to the variable area nozzle. The governor actuates the variable area nozzle to large or small area according to engine speed error signals, such signals including proportional or instantaneous errors and integral or cumulative errors.

Objects of the invention are:

To control turbine engine speed by varying the area of the discharge nozzle of the engine.

To provide a speed and acceleration sensitive governing system for adjusting the variable area nozzle of a jet engine.

To provide a positive hydro-mechanical nozzle control system for a jet engine.

To provide a nozzle control and actuating system which is rugged, dependable and sensitive, and which is powered wholly by the engine itself.

To provide area limit stops for the nozzle.

To provide an adjustable maximum nozzle area stop, operative under normal operating conditions to limit maximum nozzle area, and during afterburner operation to increase the area limit beyond the normal limit.

To provide a control to limit or stop afterburner igniter fuel feed after afterburner ignition takes place.

Reference may now be made to the drawings, wherein similar reference characters indicate similar parts, and wherein Fig. 1 is an elevation of a turbine-jet engine showing a variable area exhaust nozzle and an exemplary arrangement of control components.

Fig. 3 is an enlarged section on the lines 3—3 of Figs. 2 and 4,

Fig. 4 is a reduced section on the line 4—4 of Fig. 3,

Fig. 5 is an enlarged section on the lines 5—5 of Figs. 2 and 6,

Fig. 6 is an elevation, partly in section, on the line 6—6 of Fig. 5,

Figure 1:
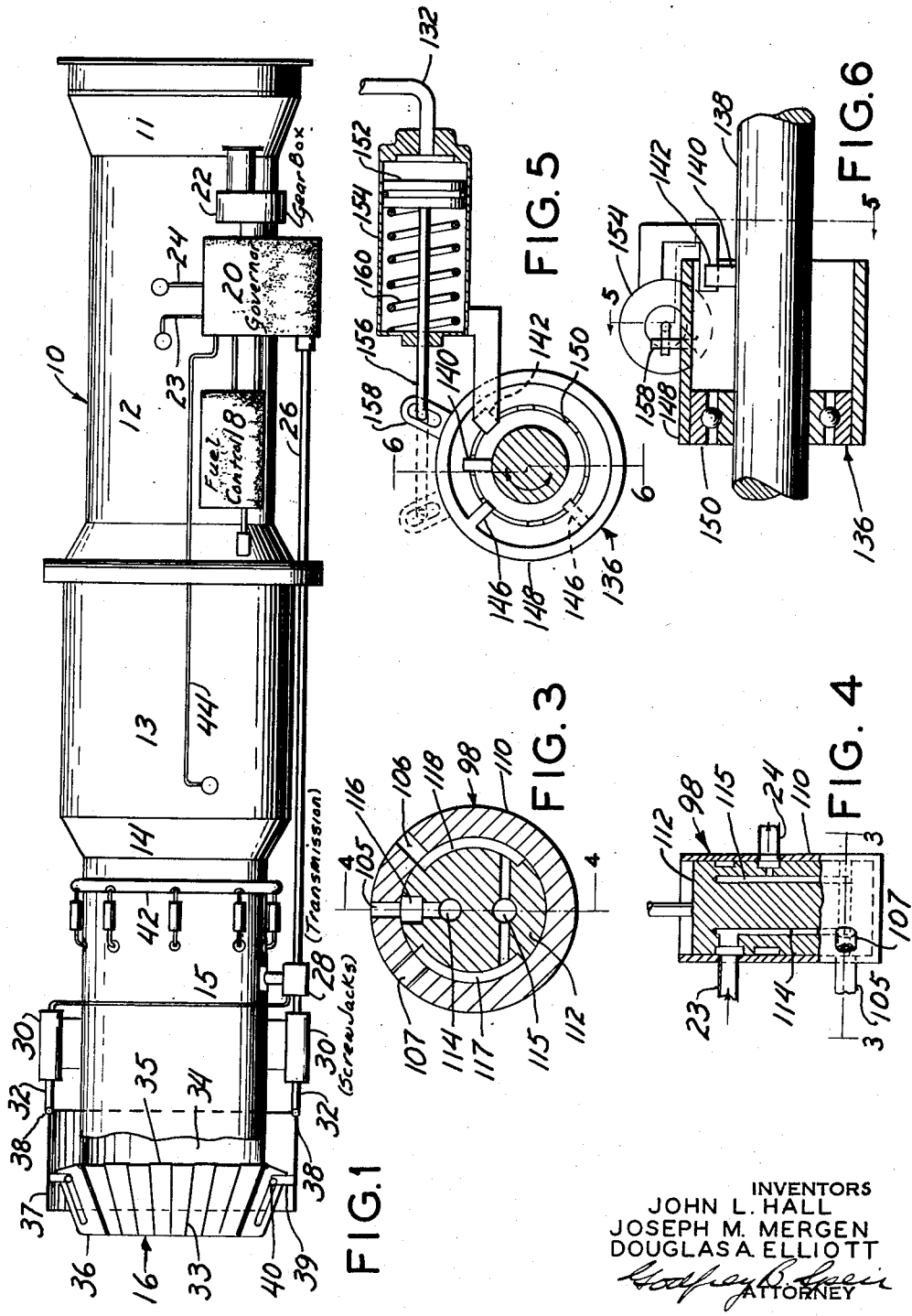

Referring first to Fig. 1, 10 represents an overall turbine jet engine which includes, as is known, an air inlet section 11, a compressor section 12, a combustion section 13, a turbine section 14, an afterburner section 15, and a variable area nozzle section 16. As is known, the turbine in the section 14 drives the compressor rotor in the section 12. A fuel control generally indicated as box 18, injects proper amounts of fuel into the combustion section 13. The fuel control is regulated by a throttle or power lever and by factors including air density, compressor pressure, turbine temperature and others, whereby engine thrust produced satisfies as far as possible the command of the power lever.

A speed governor assembly is indicated at 20, having a power input 22 driven by the turbine-compressor assembly or spool at a speed proportional thereto. The governor may have a pressure oil inlet 23 and oil outlet 24, from and to the spool lubricating system, for supplying oil for lubrication and to a hydraulic servo unit in the governor. Further, the governor has an output member 26, here shown as a rotatable shaft, for actuating the adjustable nozzle 16 through a transmission 28 and mechanisms 30, which are here contemplated as screw jacks which convert rotary motion of the shaft 26 to linear motion of rods 32.

The adjustable nozzle 16 may comprise, as shown, a plurality of leaves 33 hinged at their forward ends to a tailpipe 34, as at 35. Each leaf may have a cam-slotted tab 36 extending outwardly therefrom. A band 37, coupled at its forward end to the rods 32, at 38, embraces the leaves 33 and has inwardly protruding brackets 39, one for each tab 36, each having a stud 40 engaging in the cam slot of one of the tabs. Coincidental fore-and-aft movement of the rods 32, through the arrangement just described, moves the leaves 33 inwardly and outwardly to vary the area of the nozzle 16. Changing nozzle area, by changing the back-pressure on the turbine 14, affords speed control for the turbine-compressor spool. Other types of adjustable nozzles may be used with our invention, such as plugs or clamshells, etc.

The afterburner section 15 is provided with fuel jets fed from a manifold 42. Fuel to the afterburner is under a control separate from that used to regulate internal engine fuel. However, afterburner igniter fuel—usually a solid fuel stream fed to a jet upstream of the turbine as by a conduit 44, is under the control of the governor 20, as will be described, as well as under the control of the afterburner throttle or power lever.

Figure 7:
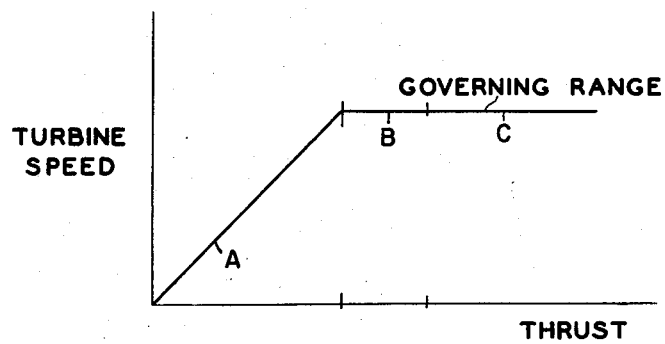
Fig. 7 is an exemplary plot of turbine speed versus thrust.
Figure 8:
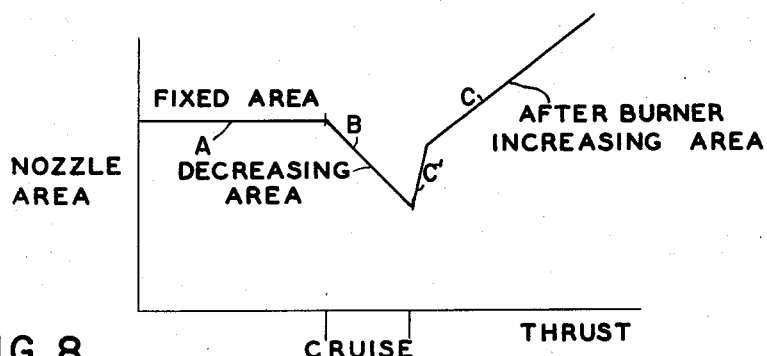
Fig. 8 is an exemplary plot of exhaust nozzle area versus thrust.
Figure 9:
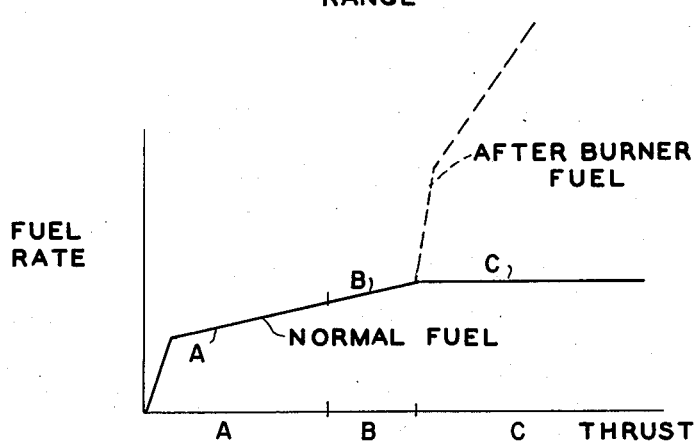
Fig. 9 is an exemplary plot of fuel rate versus thrust.

Reference may be made to Figs. 7, 8, and 9 for an appreciation of operating schedules and characteristics of an afterburning jet engine. In these curves, abscissas represent engine thrust or, alternatively, throttle or power lever advance. In Fig. 7, ordinates are turbine speed. Ordinarily, in a first range A, thrust increases with speed, to a limiting maximum speed represented by the horizontal line in ranges B and C. Further increase in thrust in ranges B and C is secured without speed increase. In range B, thrust increase is obtained by increased fuel and increased turbine temperature to a maximum tolerable level. The fuel within the engine reaches a maximum at the end of range B, and remains constant in range C as shown in Fig. 9.

In Fig. 7, the turbine speed in range A is shown as increasing linearly with thrust. This showing is merely for simplicity. Ordinarily, this is non-linear and depends on engine and fuel control system characteristics. In Fig. 8, nozzle area in range A may be fixed as shown, or may be scheduled to a particular curve form, by a governor with a changeable speed setting, the governor controlling nozzle area to be variable, rather than fixed as shown.

For this invention, range B is that wherein speed remains constant at the maximum, and nozzle area gradually is reduced, as shown in Fig. 8. At the end of range B, the engine is operating, so far as internal fuel feed is concerned, at maximum speed, fuel feed and thrust and at minimum nozzle area. Additional thrust is secured by feeding a separate supply of afterburner fuel downstream of the turbine, which affects normal maximum engine operation in tending to slow it down due to increased pressure in the tail pipe. However, this slowdown is not brought about; rather, afterburner pressure is held constant, while afterburner temperature rises with the combustion of afterburner fuel, by increasing the area of the nozzle as shown at range C in Fig. 8.

In Fig. 9, the dotted line represents the afterburner fuel rate which starts with a sharp initial rate to assure the maintenance of afterburner combustion. Thus, when the afterburner starts, there will be a step increase in nozzle area as shown at C' in Fig. 8. Thereafter, gradual increase in afterburner fuel rate will produce gradual increase in nozzle area.

It will be appreciated from the foregoing that there should be a fixed stop in the nozzle control system in ranges A and B (Fig. 8) to limit nozzle area to a fixed value, but that this stop should be out of action in range C to allow nozzle area increase for afterburner operation. Mechanism for this purpose will be described.

Control of turbine speed by adjustment of nozzle area in ranges B and C requires a powerful, fast acting system, sensitive to small speed errors and sensitive to the rate of acceleration or deceleration of the turbine. This can be attained by a so-called integral and proportional control, which broadly is one which responds with minimum time lag to actual speed errors and rate of change of speed error, and produces an output signal in terms of corrected, desired, nozzle area.

Figure 2:
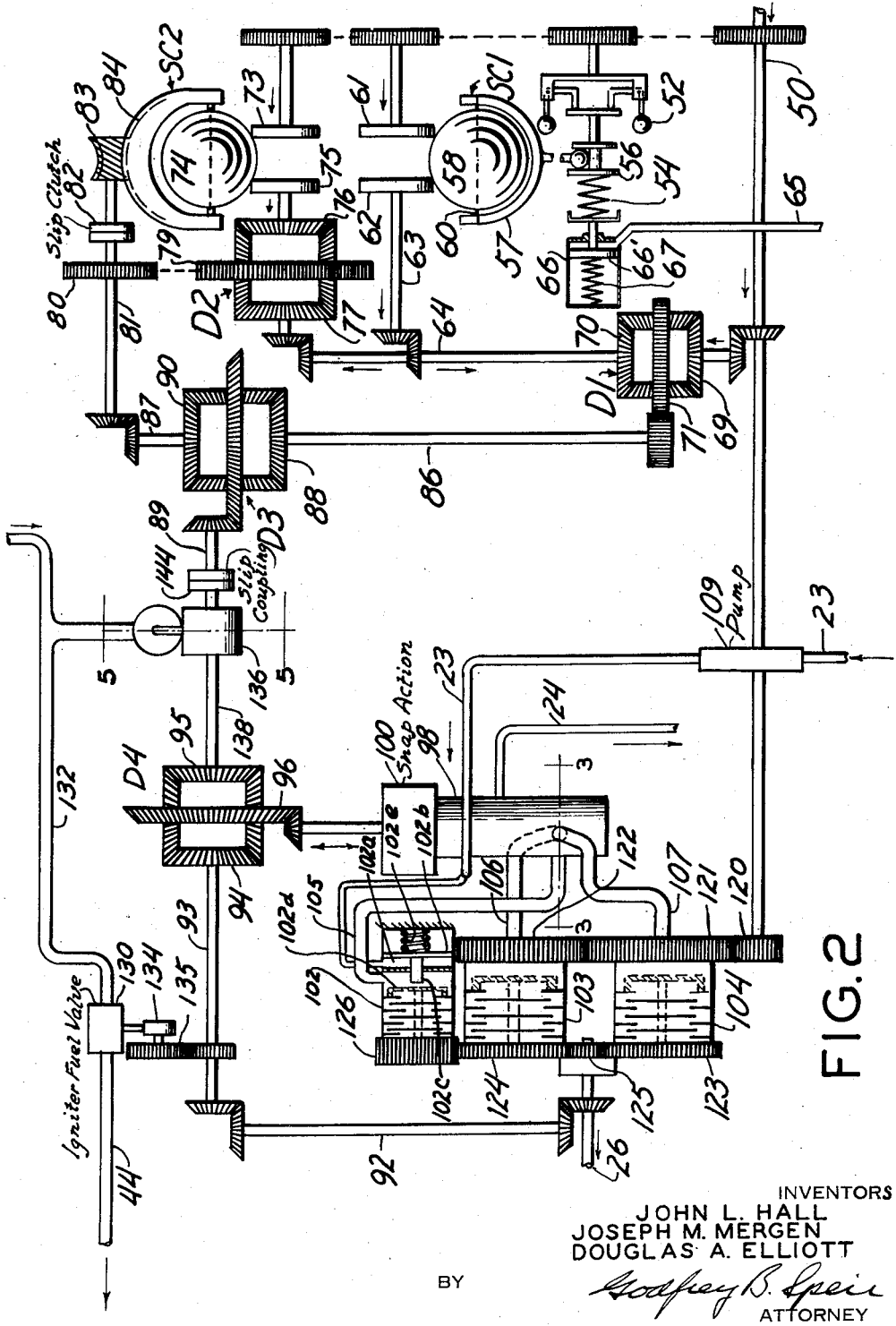
Fig. 2 is a schematic view of the engine speed governor and associated elements for controlling engine exhaust nozzle area, and other elements.

Reference may be made to Fig. 2 which shows the speed governor, the mechanism for calculating required changes in nozzle area, and the power mechanism for changing nozzle area. This is all normally contained in the governor housing 20 of Fig. 1 and also includes elements for limiting nozzle area and for assisting in afterburner control.

Mechanical power at a speed proportional to engine speed is carried to the governor system from gearbox 22 (Fig. 1) to a shaft 50. This drives a fly-weight governor 52, working against a speed-reference spring 54 having a normally constant maximum speed setting. The governor stem 56, in response to speed deviations, moves axially and swings a yoke 57 angularly. The yoke carries a ball 58 on a spindle 60 secured in the yoke, so that swinging of the yoke tilts the ball spin axis. The ball is engaged by coaxial discs 61 and 62, the former being driven from the shaft 50 and the latter driving shafts 63 and 64. The components 57—62 comprise an infinitely variable speed changer designated SC1 whose ratio is controlled by the governor. Offspeed sensed by the flyweights alters the speed changer SC1 to a ratio such that engine speed at 61 is changed to constant reference speed at 62 proportional to the desired maximum turbine speed.

Reference speed in shaft 63 may be scheduled to various values by providing an adjusting arrangement, known in the art, for varying the setting of the governor speeder spring 54.

As a safety measure to avoid excessive compressor discharge pressure in the engine, engine compressor discharge is connected at 65 to a cylinder 66 containing a piston 66' connected to the governor speeder spring 54. A stiff spring 67 normally holds the speeder spring 54 in the position for desired constant speed. If pressure in 65 becomes excessive, it compresses spring 67, moving the piston 66' leftwardly and unloading in part the speeder spring 54, reducing the speed setting. Thereby, governor action and nozzle area change slows the engine, preventing build-up of excessive compressor discharge pressure.

Shaft 50 drives one input gear 69 of a differential D1 at engine-proportional speed. Another input gear 70 of differential D1 is driven by the constant speed shaft 64 in opposite rotational sense. Output 71 of differential D1 is non-rotating when the system is on-speed; upon existence of an off-speed it rotates in a direction and at a speed in accordance with difference in speed between the shafts 50 and 64, the total rotation of this output representing the integrated or summed speed error of the engine relative to time.

Shaft 50 also drives an input disc 73 of a speed changer SC2 which includes a shiftable ball 74 and an output disc 75. The output disc 75 drives an input gear 76 of a differential D2, the other input gear 77 of this differential being driven at reference speed by the shaft 64 in the opposite direction. An output element 79 of this differential drives, through a gear 80, a shaft 81 which in turn drives a slip clutch 82 and a worm 83, the latter engaging worm wheel teeth on a yoke 84 in which the ball 74 of SC2 is carried for free rotation.

The shaft 81, as a result of these mechanisms, assumes a position which is in accord with the instantaneous off-speed, or the proportional speed error, between the engine speed and reference speed. This comes about as follows:

Assume the system is on-speed whereupon discs 73 and 75 rotate at the same speed, gears 76 and 77 rotate at the same speed in opposite directions, shaft 81 is not turned or turning, and the axis of ball 74 is disposed to set SC2 for 1:1 ratio.

Now, assume a speed increase in the engine, whereupon 73, 75, and 76 rotate faster than 77. The difference in speed produces rotation of 79 and 81, but worm 83 immediately tilts the ball 74 to change the ratio of SC2 and to bring disc 75 and gear 76 to rotate at equal and opposite speed to gear 77 and to terminate rotation of the output of D2. This transient has, however, repositioned shaft 81 to a position which is in accordance with the proportional or instant speed error.

Now, there are two functions of speed error available, one the rotation of the output gear 71 of differential D1, and the other, the position of the output shaft 81 from differential D2. These outputs are carried by shafts 86 and 87 respectively to the input gears 88 and 89 of a summing differential D3. The latter algebraically adds the two error signals and produces at the output 90, a combined error signal which calls for the actual area required at the nozzle 16. The various relative shaft speeds and gear ratios in the governing and computing system above described are selected to provide optimum proportioning of the error signal components, and a rotation of the output 90 which is compatible with the rest of the system.

The shaft 26 which controls the variable nozzle 16 and which has a specific rotational position for every nozzle area, is connected through shafts 92 and 93 to the input gear 94 of a differential D4. The computer output shaft 90 is connected to the other input gear 95 of differential D4. This differential is a follow-up device comparing nozzle area desired, from shaft 90, with nozzle area existing, from shaft 93, and the differential output 96 signals nozzle area error. This output 96 operates a hydraulic valve 98 through a snap-action mechanism 100 disclosed in the application of John L. Hall et al., Serial #498,484, filed April 1, 1955.

The valve 98 serves to connect the pressure oil supply 23 to hydraulically operated couplings 102, 103, and 104 through conduits 105, 106 and 107 respectively. The pressure oil from conduit 23, before entering the valve 98, is preferably pressure-boosted by a pump 109 driven by the engine driven shaft 50.

As will be seen in Figs. 3 and 4 the valve 98 comprises a housing 110 containing a core 112 rotatable to any one of three positions by the snap action 100. The core contains a drilling 114 connected to the pressure oil inlet 23, and a drilling 115 connected to the oil exit or drain 24. In the plane of Fig. 3, there is a port 116 communicating with drilling 114, this port connecting with any one of the openings 105, 106, or 107 according to the position of the core. The core is also provided, in the plane of Fig. 3, with arcuate grooves 117 and 118 which communicate with the drain drilling 115. When the port 116 registers with opening 105, pressure oil is connected thereto; drain groove 117 connects to opening 107 and drain groove 118 connects to opening 106. When port 116 registers with opening 107, drain groove 118 registers with openings 105 and 106; when port 116 registers with opening 106, drain groove 117 registers with opening 107 and 105.

Coupling 102 is a brake, which when engaged by application of pressure fluid thereto from conduit 105, locks the nozzle actuating shaft 26 from rotation. Couplings 103 and 104 are respectively nozzle area increasing and decreasing clutches, either of which when pressure fluid is applied thereto from the valve 98, causes drive from the engine shaft 50 to the nozzle shaft 26 to change nozzle area. The inactive couplings are connected to oil drainage so their components are free to rotate relative to each other. The drive is clear in Fig. 2; a gear 120 on shaft 50 drives an input gear 121 on coupling 104, which in turn drives an input gear 122 on coupling 103 in the opposite direction. Output gears 123 and 124 on couplings 104 and 103 respectively drive an input gear 125 on nozzle shaft 26. The brake 102 is fixed at one end, and its other end carries a gear 126 meshed with any one of the gears 123, 124, or 125.

The housing of brake 102 includes a cell 102a to which fluid pressure from conduit 23 is admitted at all times. This pressure acts on a piston 102b carrying a plunger 102c, retracting the piston and plunger in a rightward direction away from the brake actuating piston 102d, and compressing a spring 102e. If hydraulic pressure in the line 23 should fail for any reason, the spring 102e moves the plunger 102c to the left to engage the brake and to prevent change in nozzle area. If there is no restraint on the nozzle from the brake 102, it tends to increase in area and to allow turbine overspeed. Thus the arrangement just described provides a fail-safe device.

While hydraulic means are used for energizing the couplings, mechanical or electrical means are also applicable. Hydraulics are convenient in the embodiment shown as pressure oil is readily available from the engine system.

As previously described, the output shaft 26 from the governor and clutch assembly of Fig. 2 drives gearing 28, screw jacks 30 and rods 32, all in Fig. 1, which serve to change the area of the nozzle 16.

In Fig. 2, we show a fuel valve 130 for afterburner igniter fuel which flows from the afterburner fuel control not shown, to the valve 130, through a conduit 132 and thence through conduit 44 to a fuel jet upstream of the turbine of the engine. The valve 130 is operated by a cam 134 driven by a gear 135 driven by the shaft 93 or its equivalent, whereby valve opening and closing is controlled according to variable nozzle area.

Preferably, the valve 130 closes when nozzle area is substantially greater than the minimum area of range B in Fig. 8, at a point well up on the line C' where afterburner operation and ignition is certain as revealed by substantial nozzle area increase.

The afterburner fuel control, not shown, would only be made active at the end of range B and through ranges C and C' (Figs. 7, 8, and 9). When rendered active, nozzle area is small and valve 130 is open, so that igniter fuel passes to the conduit 44. After ignition of main afterburner fuel flowing to manifold 12, nozzle area increases and after increase to a certain area, valve 130 shuts off by action of cam 134.

Should an afterburner blow-out occur, nozzle area will automatically decrease, restarting the flow of afterburner igniter fuel by opening of valve 130.

If the afterburner is turned off at the afterburner main fuel control, this will also shut off igniter fuel to the conduit 132.

Control of afterburner igniter fuel shutoff can be accomplished by means other than that just described or in combination with that just described. For instance, there could be a time delay valve associated with the system so that, if afterburner ignition failed to take place within a reasonable interval after the afterburner is turned on, the fuel supplies could be cut off to avoid fuel wastage.

Figs. 5 and 6 show a variable nozzle area stop mechanism 136, also shown in Fig. 2. The shaft 138, positioned by the governor to call for nozzle area desired and connecting shaft 90 and gear 95 of differential D4, carries a tab 140. At minimum allowable nozzle area demand, the tab engages a fixed stop 142, preventing further rotation of the shaft 138. Should the differential D3 call for still smaller nozzle area, the shaft 90 will slip relative to shaft 138 through a slip coupling 144. A two-position maximum nozzle area stop 146, engageable at times by the tab 140, is carried on a ring 148 piloted on a bearing 150 to remain coaxial with shaft 138. This ring is rotatable through a limited arc as shown in Fig. 5, to a clockwise extreme position wherein the stop 146 (in solid lines) establishes the maximum limiting nozzle area for non-afterburning operation of the engine. It is also movable to an anti-clockwise extreme position wherein the stop 146 (in dotted lines) establishes the larger maximum limiting nozzle area for operation of the engine with the afterburner turned on.

Shift of the ring 148 between the two positions is accomplished by a piston 152 slidable in a cylinder 154, the piston being connected to the ring by a rod 156 and clevis 158. The piston is urged to the right by a spring 160, urging the stop 146 to the position for the non-afterburning nozzle area limit. When the afterburner fuel control is turned on, and so long as it remains on, igniter fuel pressure will exist in the conduit 132. This is connected to the right end of the cylinder 154, so that the fuel under pressure moves the piston 152 leftwardly against the action of, and compressing, the spring 160. Instead of pressure of igniter fuel, some other signal pressure or other signal may be used to shift stop 146, or to bring alternative maximum area stops into action. Thereby, the stop 146 is shifted to the dotted line position, allowing nozzle area to increase under the control of the governor assembly 20.

The foregoing control system is described in connection with a so-called single spool engine, namely, one wherein a single turbine wheel drives a single compressor rotor. It is the speed of the single spool which is controlled by the variable nozzle. There are also multi-rotor engines wherein one spool includes a turbine wheel and a compressor rotor, and another rotary assembly, usually coaxial with the first, includes another turbine wheel and possibly a second compressor rotor, the rotary assembly rotating independently of the spool. The control system of this invention is applicable to control the speed of one of the rotors. The other rotor would normally be speed-controlled by the normal fuel regulating system which would incorporate its own speed limiting and other control parameters.

The control system of the invention may be applied to inlet air control to a turbine engine, instead of to exhaust nozzle control. Further, it may be used with any type of air-consuming turbine power plant, including turbo jets, turbo props, bypass turbine engines and ducted fan engines.

This description has covered the construction, operation and function of a present preferred embodiment of our invention. It is clear, however, that many changes, substitutions, modifications and rearrangements may be made while still coming within the scope of the broad principles which we have conceived.

It is to be understood that such changes and the like may be made without departing from the scope of the invention, as such scope is limited by the following claims.

We claim:
1. In a turbojet engine including a variable area jet nozzle and means for altering the area thereof, means responsive to engine speed to actuate said altering means, two maximum area limit adjustments for said nozzle allowing limiting lesser and greater nozzle areas, and means for shifting the lesser area adjustment out of action in response to operation of said engine in the range of maximum power to activate the greater area adjustment.

2. In a turbojet engine including a variable area exhaust nozzle, an engine speed governor responsive to speed error between actual and a desired speed operable to vary the area of said exhaust nozzle, an afterburner on said engine disposed upstream of said nozzle, a normal maximum nozzle area stop to limit nozzle area during non-afterburning operation of said engine, and means responsive to afterburner operation to move said normal maximum area stop to a different position.

3. In a turbojet engine including a variable area exhaust nozzle, an engine speed governor responsive to speed error between actual and a desired speed operable to vary the area of said exhaust nozzle, an afterburner on said engine disposed upstream of said nozzle, a normal maximum nozzle area stop to limit nozzle area during non-afterburning operation of said engine, means responsive to afterburner operation to move said normal maximum area stop to a different position, means for supplying igniter fuel to the afterburner, and means responsive to increase in nozzle area for cutting off the supply of igniter fuel to the afterburner after the starting of afterburner operation.

4. In an afterburner equipped turbojet engine having a variable area nozzle downstream of the afterburner, power actuating means for varying the area of said nozzle, a fixed maximum area stop to limit maximum nozzle area during engine operation without the afterburner, and means responsive to afterburner operation to shift said stop to a different position.

5. In a gas turbine engine having a nozzle and movable means associated with the nozzle for varying the effective area thereof, a selectively operable mechanical driving connection from said engine to said movable means including a friction clutch having input elements driven by the engine and output elements drivably connected to said movable means, and hydraulic mechanism connected and operable to engage and disengage said clutch.

6. In a gas turbine engine having a nozzle and movable means associated with the nozzle for varying the effective area thereof, a selectively operable mechanical driving connection from said engine to said movable means including a pair of friction clutches each having input elements driven by the engine and output elements drivably connected to said movable means, one said clutch when coupled connecting the engine to the movable means to increase nozzle area, and the other clutch when coupled connecting the engine to the movable means to decrease nozzle area, and hydraulic mechanism connected and operable to engage one or the other of said clutches.

7. The combination as defined in claim 6 including a brake to secure the mechanical driving connection against movement, and means responsive to the engaging of one or the other of said clutches to disengage said brake.

References Cited in the file of this patent
UNITED STATES PATENTS

| | | |
|---|---|---|
| 940,162 | Kerr | Nov. 16, 1909 |
| 2,376,142 | Hoffman et al. | May 15, 1945 |

(Other references on following page)

UNITED STATES PATENTS

| | | |
|---|---|---|
| 2,457,595 | Orr, Jr. | Dec. 28, 1948 |
| 2,520,967 | Schmitt | Sept. 5, 1950 |
| 2,551,502 | Montrose-Oster | May 1, 1951 |
| 2,667,344 | Robbons | Jan. 26, 1954 |
| 2,688,841 | Drecher et al. | Sept. 14, 1954 |
| 2,699,646 | Baker | Jan. 18, 1955 |
| 2,720,927 | Mergen et al. | Oct. 18, 1955 |
| 2,726,507 | Baker | Dec. 13, 1955 |
| 2,753,729 | Main | July 10, 1956 |